United States Patent [19]

Schad et al.

[11] Patent Number: 4,793,960

[45] Date of Patent: Dec. 27, 1988

[54] PROCESS FOR PREPARING HOLLOW PLASTIC ARTICLES

[75] Inventors: Robert D. Schad, Toronto; Herbert Rees, Orangeville; Gary Hughes, Nobleton; John R. Murchie, Aurora, all of Canada

[73] Assignee: Husky Injection Molding Systems Ltd., Bolton, Canada

[21] Appl. No.: 31,540

[22] Filed: Mar. 30, 1987

Related U.S. Application Data

[60] Division of Ser. No. 733,969, May 14, 1985, Pat. No. 4,690,633, which is a continuation-in-part of Ser. No. 648,793, Sep. 7, 1984, Pat. No. 4,522,581.

[51] Int. Cl.[4] .............................................. B29C 49/02
[52] U.S. Cl. ..................................... 264/535; 264/294
[58] Field of Search ............... 425/522, 526, 528, 534, 425/326.1, 533, 253, 254, 255, DIG. 117, DIG. 118; 264/521, 535, 537, 538, 294; 198/465.1, 465.2, 803.01, 803.12

[56] References Cited

U.S. PATENT DOCUMENTS

| | | | |
|---|---|---|---|
| 3,324,507 | 6/1967 | Arlo | 425/526 |
| 3,339,230 | 9/1967 | Farrell | 425/526 |
| 4,102,626 | 7/1978 | Scharrenbroich | 425/526 |
| 4,140,464 | 2/1979 | Spurr et al. | 425/533 |
| 4,354,813 | 10/1982 | Collombin | 264/535 |
| 4,365,950 | 12/1982 | Harry et al. | 425/534 |
| 4,382,760 | 5/1983 | Wiatt et al. | 264/521 |
| 4,426,202 | 1/1984 | Krishnakumar et al. | 425/534 |
| 4,470,797 | 9/1984 | Harry et al. | 425/526 |

Primary Examiner—Jay H. Woo
Assistant Examiner—Timothy W. Heitbrink
Attorney, Agent, or Firm—Bachman & LaPointe

[57] ABSTRACT

The method of the present invention involves transferring plastic parisons from a receiving station to a finishing station on a plurality of pallets in a single row for forming said parisons into hollow plastic articles. The pallets with parisons thereon are transported through a temperature conditioning means for temperature conditioning said parisons to render same suitable for forming into said hollow plastic articles at the finishing station.

6 Claims, 8 Drawing Sheets

PROCESS FOR PREPARING HOLLOW PLASTIC ARTICLES

CROSS-REFERENCE TO RELATED APPLICATION

This application is a Divisional of application Ser. No. 733,969, Filed May 14, 1985, now U.S. Pat. No. 4,690,633, which in turn is a Continuation-In-Part of U.S. patent application Ser. No. 648,793, Filed Sept. 7, 1984, now U.S. Pat. No. 4,522,581.

BACKGROUND OF THE INVENTION

Our present invention relates to a method and apparatus for producing, by injection or compression molding (collectively referred to as pressure molding), partly finished workpieces which are transferred sequentially to one or more aftertreatment stations for the performance of secondary operations thereon. In particular, the workpieces may be parisons of polymeric material and the secondary operations may be a thermal conditioning thereof followed by their transformation into hollow articles, such as containers, by blowing with or without mechanical stretching.

A system for conveying parisons or preforms by means of pallets into and out of a blow molding station has been described in U.S. Pat. No. 4,426,202 to Krishnakumar et al. According to that patent, the parisons or preforms presumably molded at a remote location are carried in groups on rotatable collets of roller-supported pallets which move on a track to the blow molding station where each parison is introduced between two open mold halves, subsequently closing therearound for transforming same into bottles. During the blow and briefly thereafter, the parisons and the bottles formed therefrom remain attached by their necks to the collets of their pallets which, however, do not otherwise participate in the blow molding operation. On the contrary, as expressly stated in the patent, the support of the preforms, i.e. the engagement of their flanges for holding them in position, is transferred from the pallet to the blow mold during the blowing operation. Nothing is said about where or how the pallets, which are separated from their track after the blow, are loaded and unloaded.

A major object of the present invention is to provide an improved method and apparatus for the continuous recirculation of a sufficient number of pallets between a receiving station, at which they are to be loaded with workpieces yet to be finished, and one or more aftertreatment stations for further handling and finishing.

Another object is to provide a method and apparatus as aforesaid in which the loading of the pallets with newly arriving workpieces, their transportation to the aftertreatment stations, their handling in the latter stations and the return of the pallets to the receiving station are precisely synchronized with one another and with the source of the workpieces, e.g., an injection molding machine, to provide the desired high degree of efficiency.

It is also an object of the present invention to provide an improved pallet structure for a system of this type which enables accurate location and secure retention of each parison in a finishing station, particularly in a blow molding station in which it is inflated with or without the use of a stretching rod.

A more particular object of the present invention is to synchronize the operation of a molding apparatus, specifically an injection molding machine, with those of a temperature conditioning and a blow molding station, having regard to the fact that an operating cycle of the latter station is considerably shorter than that of an injection molding machine so that the difference in timing has to be taken into account. Since the overall number of available pallets will normally be limited, the present invention further aims at insuring a return of unloaded pallets to the loading point in time for having them receive the newly arriving partly finished workpieces in keeping with the cycle of the injection molding machine.

SUMMARY OF THE INVENTION

In accordance with the present invention the foregoing objects and advantages, as well as others, may be readily obtained. The apparatus of the present invention is an apparatus for preparing hollow plastic articles which comprises: a receiving station for receiving a first number of plastic parisons; a finishing station for forming said plastic parisons into said hollow plastic articles; a first conveyor means moving from said first receiving station to said finishing station; a second conveyor means returning from said finishing station to said receiving station; a multiplicity of pallets successively entrainable by said conveyor means in a single row, each of said pallets being provided with holding means for holding a second number of parisons less than said first number; means to transfer said pallets from said finishing station to said second conveyor means; means for transferring said pallets from said second conveyor means one at a time to said receiving station until said holding means at said receiving station corresponds to said first number; and means for transferring said pallets with said parisons thereon one at a time from said receiving station to said first conveyor means. A temperature conditioning means is provided adjacent said first conveyor means between the said receiving station and finishing station for conditioning the temperature of the parisons to render same suitable for forming into said hollow plastic articles at said finishing station operative to condition the temperature of said parisons to first equalize the temperature of said parisons and second to obtain the desired temperature profile for forming into said hollow plastic articles.

The process of the present invention comprises transferring a plurality of plastic parisons to a multiplicity of pallets at a receiving station; conveying said pallets with the parisons thereon in a single row from said receiving station to a finishing station for forming said parisons into said hollow plastic articles; providing conditioning means between said receiving station and finishing station for conditioning the temperature of the parisons to render same suitable for forming into said hollow plastic articles at said finishing station; and transporting said pallets with parisons thereon through said temperature conditioning means in a single row to first equalize the temperature of said parisons and second obtain the desired temperature profile for forming into said hollow plastic article The pallets with parisons thereon are transferred from said receiving station to said finishing station via a first conveyor means and the empty pallets are returned from said finishing station to said receiving station via a second conveyor means, with the pallets transferred from said second conveyor means to said receiving station one at a time until the desired number of pallets is present at said receiving station. After the parisons are loaded on the pallets, the pallets are transferred from said receiving station to said first conveyor means one at a time so that they can be moved from the receiving station to the finishing station in a single row one at a time.

It is a particular advantage of the process and apparatus of the present invention that the output of an injection molding machine may be coordinated with the receiving station so that one can transfer a first number of plastic parisons directly from an injection molding operation to the desired number of pallets at the receiving station. This is coordinated with the finishing station so that the more rapid output of the blowing operation is not an impediment to the slower injection operation. The pallets are moved serially one at a time in a single row from the receiving station to the finishing station where the finishing operation is conducted on one pallet at a time. Correspondingly, the pallets pass through the temperature conditioning means in a single row so that the temperature exposure in the temperature conditioning means may differ one pallet to the other. The present invention is suitable for accommodating this differential temperature treatment without reduction in cycle time which represents a considerable advantage. Similarly, the returning pallets return to the receiving station in a single file one at a time and are loaded in the receiving station one at a time until the desired number of pallets is present thereat. Thus, the entire cycle is carefully coordinated to maximize efficiency.

In an additional feature of the present invention the carrying means for transferring the parisons from the injection molding means to the receiving station may comprise a hollow tube having cooling means therein for post cooling the plastic parisons. Suitably, the hollow tube is dimensioned with a slight taper so that the parison will not fit completely therein. Upon post cooling the parison the parison shrinks somewhat so that the parison slides downward along the tapered wall retaining a good heat exchange relationship with the wall and is maintained in its final position via suction or other means inside the tapered tube.

The process and apparatus of the present invention will be more fully described hereinbelow together with additional advantages thereof.

BRIEF DESCRIPTION OF THE DRAWINGS

The present invention will be more readily apparent from a consideration of the following illustrative drawings wherein.

DETAILED DESCRIPTION

The apparatus and process of the present invention in a representative embodiment for transporting the parisons from the receiving station to the finishing station and temperature conditioning same can be clearly seen in FIGS. 1-4.

Figure 1:
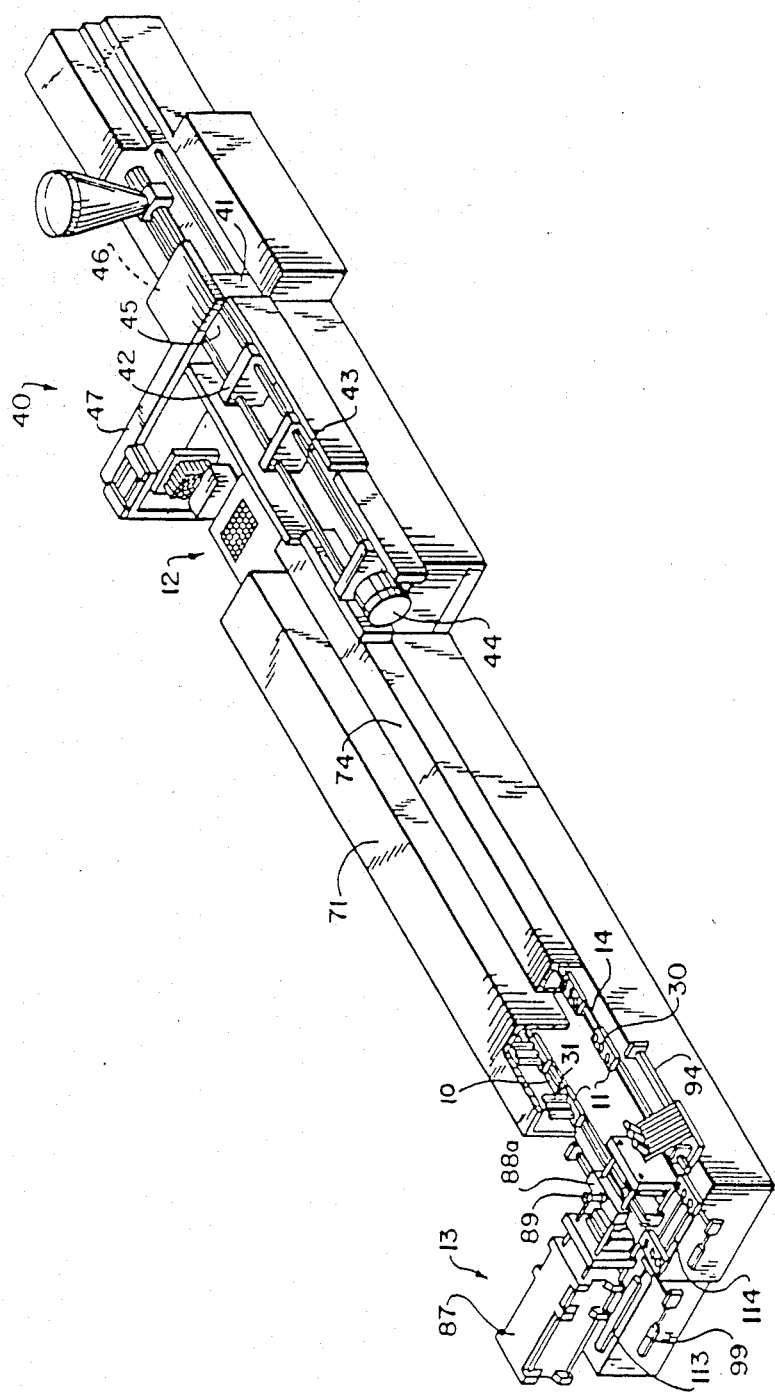
FIG. 1 is a perspective view of the apparatus of the present invention.
Figure 1A:
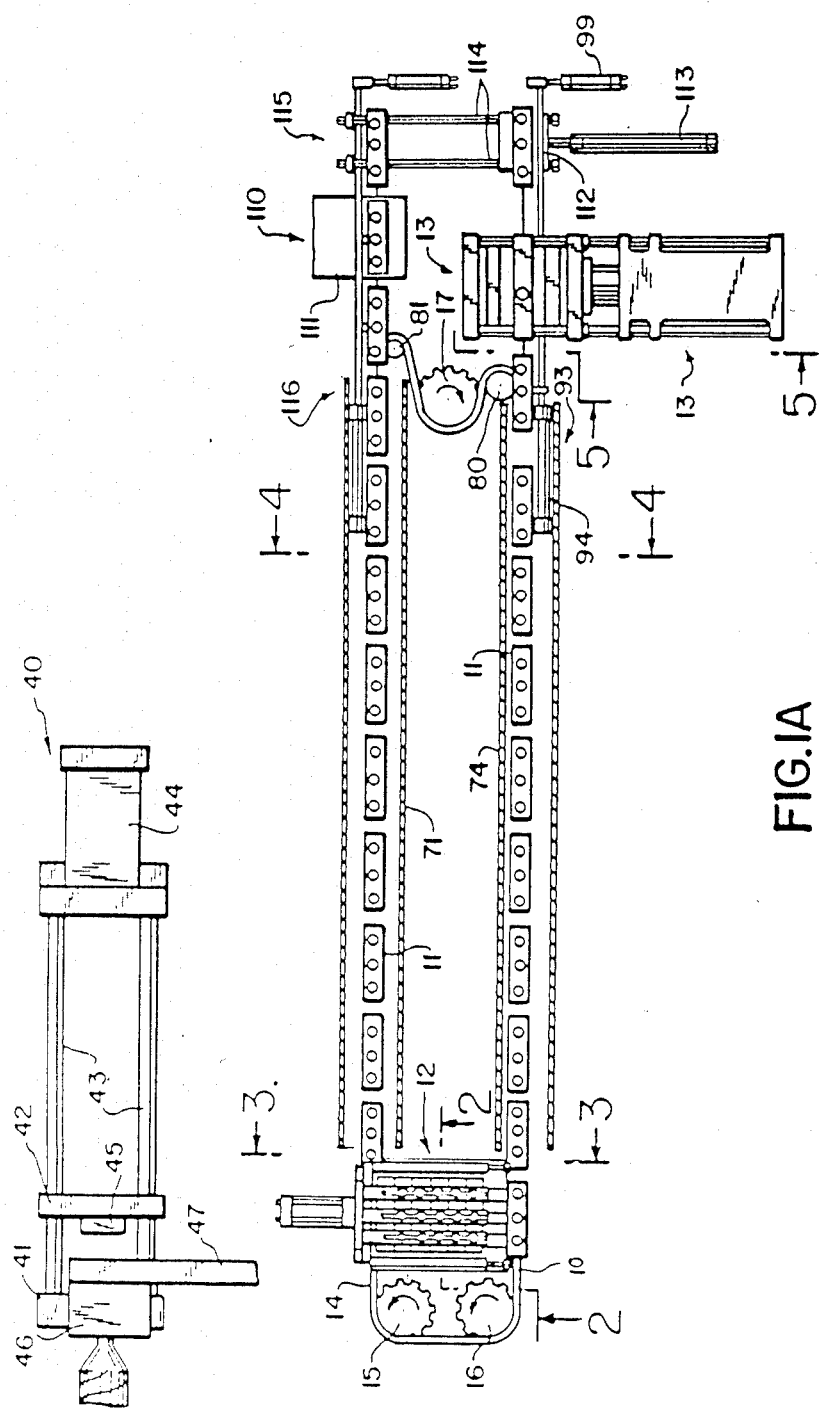
FIG. 1A is a top view of the apparatus of the present invention.

Referring to FIGS. 1 and 1A, first conveyor means 10 transports pallets 11 from receiving station 12 to finishing station 13. The empty pallets are returned to the receiving station 12 via second conveyor means 14. Thus, as seen in FIG. 1A the first conveyor means moves from left to right and the second conveyor means moves from right to left. The conveyor means preferably comprises a continuous chain or belt as shown, although separate, synchronized chain sections may be used. Sprockets 15, 16 and 17 are shown engaging chain links 18 of the conveyor means for moving same in a rotary direction, see FIGS. 3 and 4. Thus, as shown in FIG. 1A, sprockets 15 and 16 move counterclockwise and sprocket 17 moves clockwise so that the chain links and hence the conveyor means are transported in a desired direction. Any desired motive means may be utilized to power any one or more of the sprockets so that, for example, one sprocket may be powered and the others may freely rotate. Chain guides 19 are provided around chain links 18 in order to guide same in their path. Means are provided associated with the conveyor means and engageable with the pallets for pushing the pallets along the conveyor means, such as pusher means 20 connected to chain links 18 which engage the base of pallets 11 in order to push the pallets along their path. These can be clearly seen in FIG. 4.

The pallets 11 contain a desired number of parison holding means or plugs 30 for holding parisons 31 via the open neck thereof 32, with three such plugs per pallet shown in the drawings. Pallets 11 comprise a platform member 33 supporting parison holding means or lugs 30 which are rotatably journaled to pull means 34 beneath platform member 33 so that the pulley means 34 and hence the plugs may be rotated in a clockwise or counterclockwise direction as desired. Any number of parison holding means or plugs 30 may be selected for each pallet. Generally, the number of plugs per pallet will correspond to the number of blow molds at the finishing station to be described hereinbelow. pallets 11 are guided by channel track 35 as they move on the conveyor means.

Figure 2:
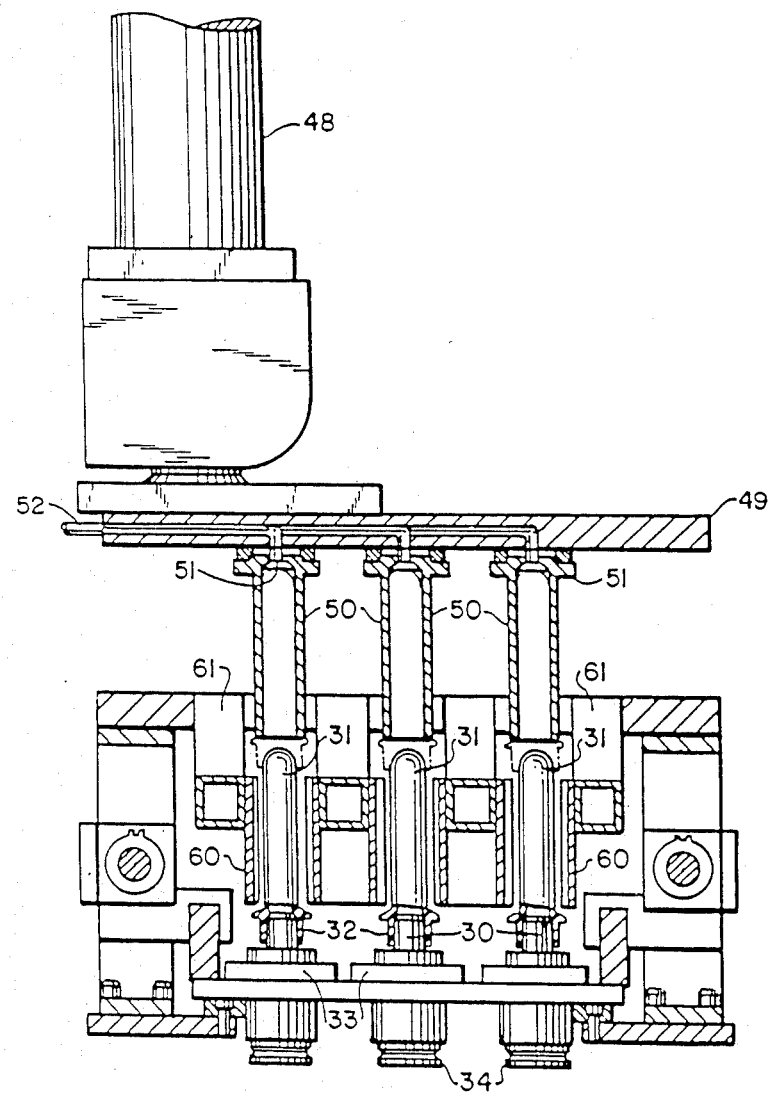
FIG. 2 is a cross-sectional view along the lines 2—2 of FIG. 1A.

The parisons are preferably delivered to the receiving station as the output of an associated injection molding machine, although other parison preparation or delivery means may be used, for example, compression or extrusion molding. In the preferred embodiment as shown in FIGS. 1 and 1A, injection molding machine 40 prepares the appropriate number of parisons based on the capacity of the injection molding machine. Naturally, any desired injection molding configuration may be used. As shown in FIGS. 1 and 1A, the injection molding machine includes a fixed platen 41 and a movable platen 42. The movable platen moves on tie rods 43 via machine clamp 44. Mold means 45 are provided between the fixed and movable platen to prepare the desired number of parisons Carrier means such as robot 46 are provided adjacent the fixed and movable platen having track 47 for carrying robot arm 48 (see FIG. 2) which in turn carries robot plate 49. Robot plate contains adjacent thereto a number of parison carrying means 50 corresponding to the number of parisons prepared in the injection molding machine Carrying means 50 are open ended hollow tubes having channel means 51 at the base thereof connected to vacuum or suction means 52 for holding the parisons in the tubes. Thus, parisons are formed in injection molding machine 40, movable platen 42 disengages from the fixed platen 41 and robot arm 48 carrying robot plate 49 moves between the fixed and movable platen so that parison carrying means or tubes 50 engage parisons 31. Suction means 52 is used to transfer parisons 31 from the injection molding machine to tubes 50 and retain the parisons therein. Robot plate 49 is then moved out from between fixed platen 41 and movable platen 42 and rotated so that robot plate 49 is placed adjacent receiving station 12 as shown in FIG. 2. Parisons 31 are then delivered to pallets 11 by releasing the suction from suction means 52. Parisons 31 are then released so that the open neck portion 32 engages plugs 30 with guide tube 60 supported by support frame 61 insuring that the parisons are properly directed to engage plugs 30. Referring to FIG. 2, it can be seen that the parisons 31 are properly seated on plugs 30. As shown in phantom in FIG. 2, open neck 32 indicates the position of the parison in tubes 50.

Figure 3:
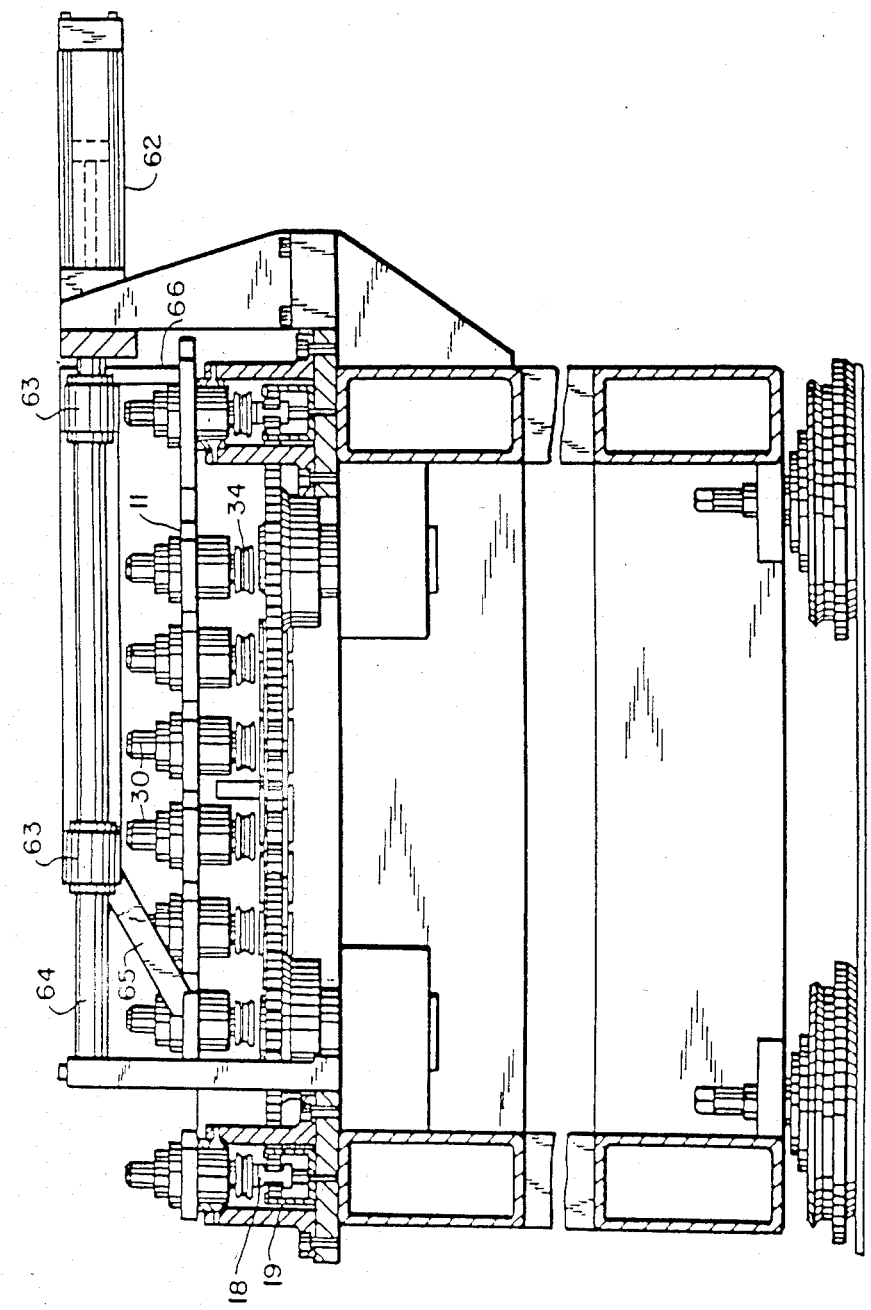
FIG. 3 is a cross-sectional view along the lines 3—3 of FIG. 1A.
Figure 3A:
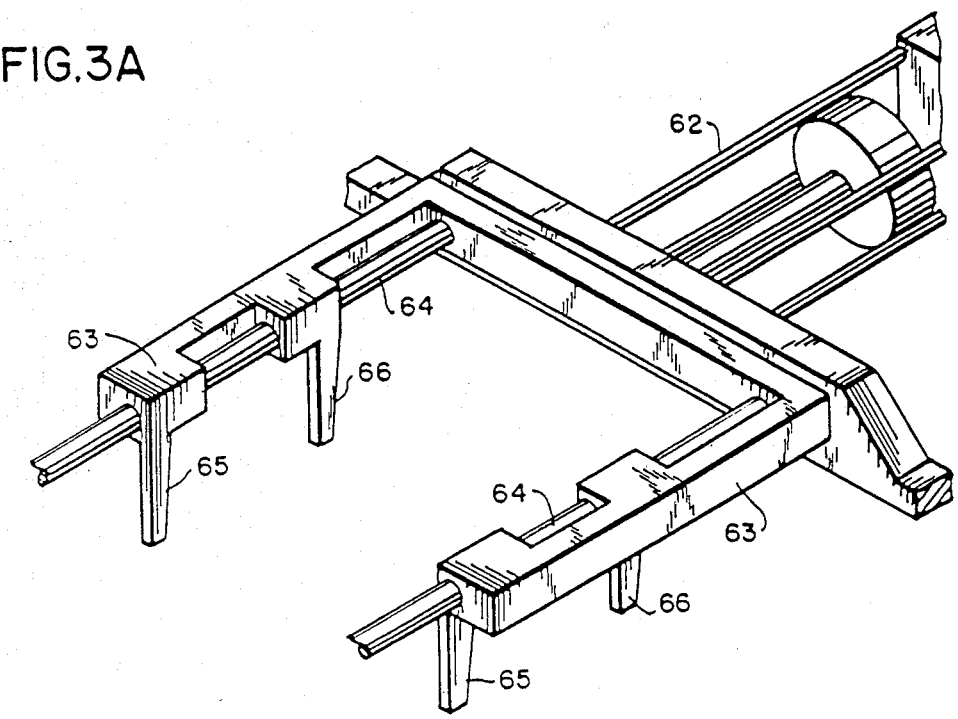
FIG. 3A is a perspective view of the pusher means shown in FIG. 3.

After the parisons are loaded on pallets 11 the pallets are transferred one at a time from the receiving station to the first conveyor means 10. Simultaneously therewith, an empty pallet is transferred from the second conveyor means to the receiving station. This operation can be seen in FIGS. 3 and 3A wherein pusher means 62 is provided above the level of the pallets having a pusher frame 63 and pusher rods 64 journaled therein. Pusher frame 63 carries forward pusher arms 65 and rearward pusher arms 66. The forward pusher arms 65 engage the pallet adjacent the first conveyor means and the rearward pusher arms 66 engage the pallet on the second conveyor means. Upon activation of pusher 62 pusher arms 65 and 66 cooperate to move the pallet adjacent the first conveyor means from the receiving station to the first conveyor means and the pallet from the second conveyor means to the receiving station. This operation is continued until the pallets with parisons thereon are moved one at a time from the receiving station to the first conveyor means and until empty pallets from the second conveyor means are moved to the receiving station so that the receiving station contains a series of empty pallets corresponding to the product output of the injection molding machine. The parisons are then transferred from the injection molding machine to the empty pallets at the receiving station as described hereinabove.

As indicated hereinabove, the initial step of the temperature conditioning cycle for conditioning the parisons from the injection molding machine to the finishing station is the post cooling operation conducted in the parison carrying means or tubes 50. Preferably, the parison carrying means or tubes are provided with heat transfer means which will be described in more detail hereinbelow in order to post cool the still warm parisons from the injection molding operation.

Figure 4:
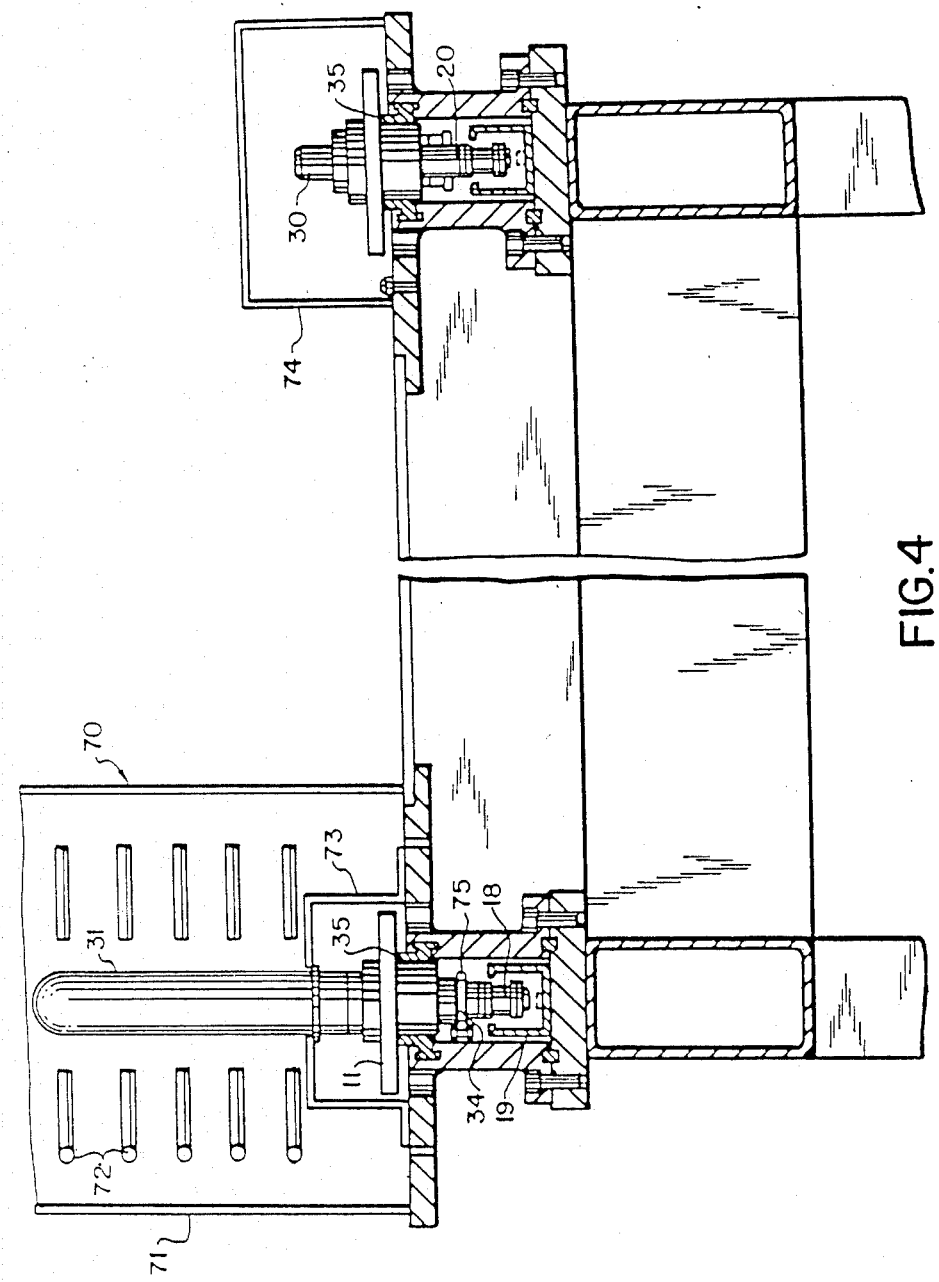
FIG. 4 is a cross-sectional view along the lines 4—4 of FIG. 1A.

The parisons are then transported from the receiving station 12 to the finishing station 13 on first conveyor means 10. A temperature conditioning means 70 is provided adjacent the first conveyor means 10 so that parisons 31 can have their temperature properly conditioned on their path from the receiving station to the finishing station. The purpose of the temperature conditioning means is to condition the temperature of the parison to render same suitable for forming into hollow plastic articles at the finishing station. The features of the preferred temperature conditioning means can be clearly seen in FIG. 4. The plastic parisons 31 on pallets 11 pass through temperature conditioning means 70 in a single row. The temperature conditioning means first equalizes the temperature of the parisons and second obtains the desired temperature profile for forming said parisons into hollow plastic articles. FIG. 4 shows conditioning tunnel 71 surrounding parisons 31 and containing temperature conditioning means 72 adjacent parisons 31. A plurality of such temperature conditioning means 72 are provided along the length of the parisons in order to provide the exact temperature profile needed by the parison in the finishing operation. The temperature conditioning means may be radiant or air jets and these may also be used to first equalize the temperature of the parisons. The parisons arrive at the first conveyor means with an unequal distribution of temperature between the inside and outside thereof. Thus, it is the first stage of the temperature conditioning means to equalize the temperature between the inside and outside thereof by means of temperature conditioning means 72 or if desired simply air jets in the initial stage of the conditioning tunnel 71. After the temperature of the parison has been equalized, a plurality of temperature conditioning means 72 may be provided adjacent various points along the length of the parison in order to provide the exact temperature distribution desired for the particular plastic and particular bottle configuration. One can very accurately control the temperature equalization and temperature profiling operation by controlling the length of the conditioning tunnel and the temperature conditioning means, and this despite the fact the individual pallets remain in the tunnel for different periods of time. Protective cover 73 is provided to protect the open neck portion 32 of the parisons so that the open neck portion is not subjected to the temperature equalization step. Safety cover 74 may be provided on the return flight in order to protect the empty pallets. If one desires to rotate the parisons during their passage through the temperature conditioning tunnel, stationary belt 75 or other means may be provided adjacent and in contacting relationship with pulley means 34 thus rotating the pulleys and hence the parisons. The rotation may be controlled by the speed of movement of the pallet, the diameter of the pulley and/or whether or not belt 75 is stationary or movable.

At the downstream end of the first conveyor means chain links 18 of the continuous chain pass around idler roll 80 and downstream sprocket 17 and idler roll 81 to start the return flight along second conveyor means 14.

Figure 5:
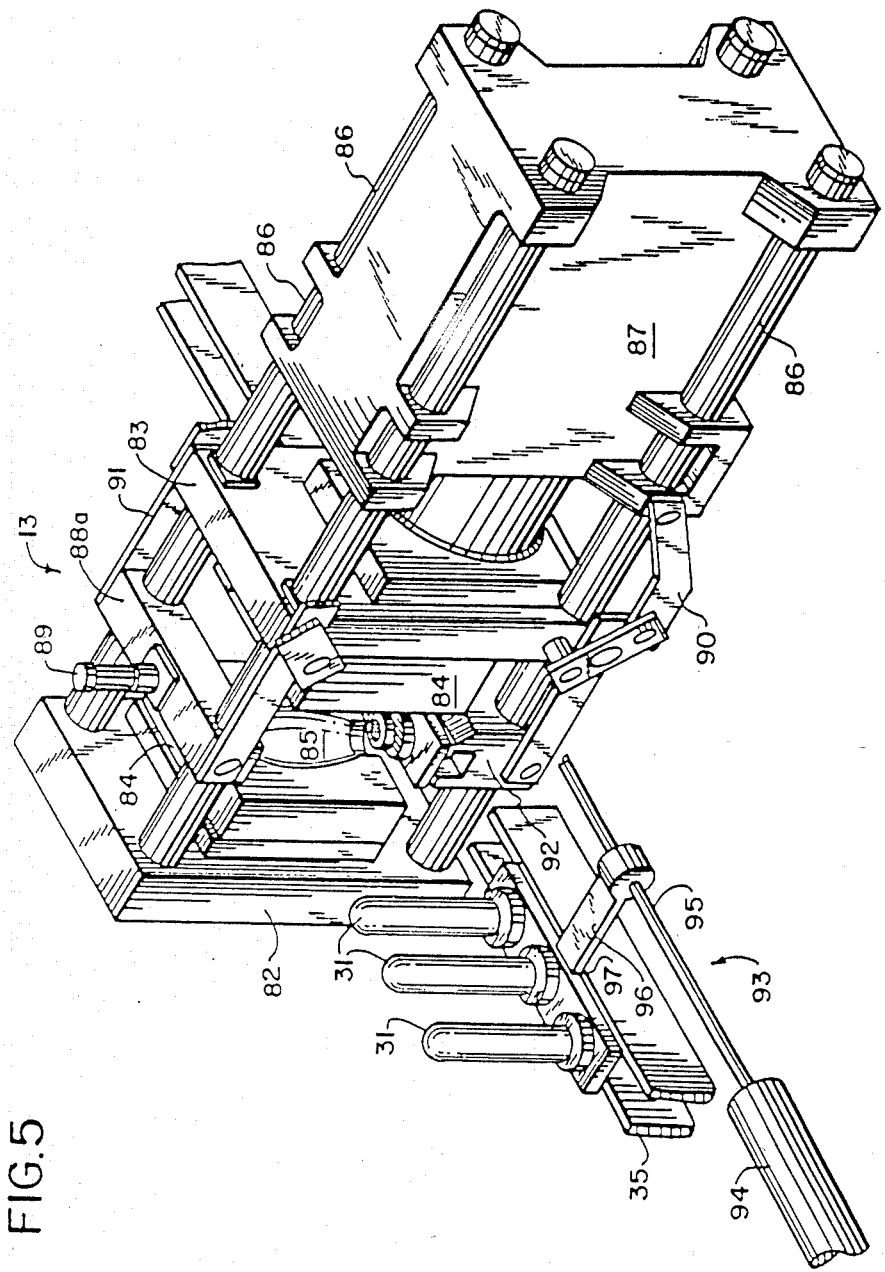
FIG. 5 is an isometric view of the finishing station shown in FIG. 1A.
Figure 5A:
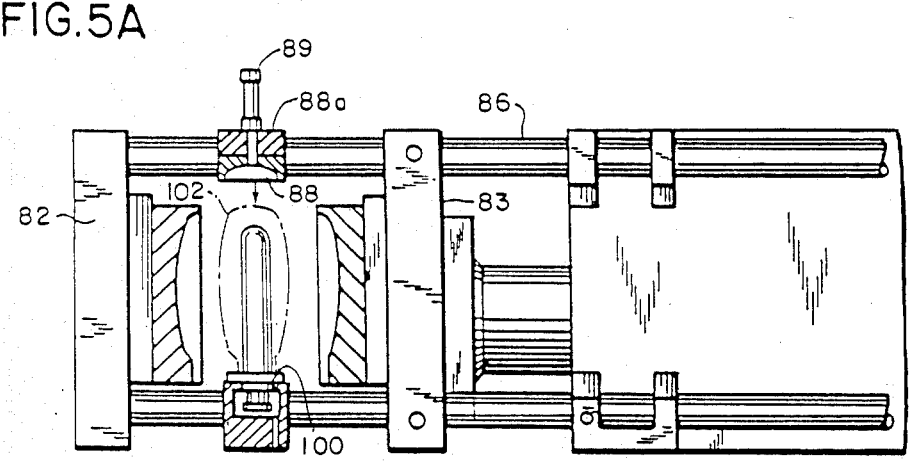
FIG. 5A is a schematic view of the finishing station.
Figure 5B:
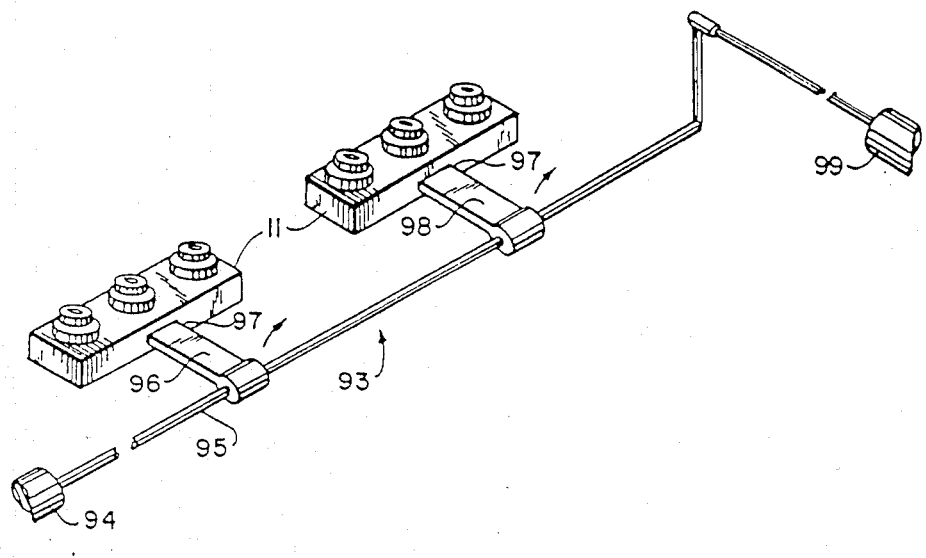
FIG. 5B is a perspective view of the engaging means for moving the pallets into the finishing station and out of the finishing station.

Referring now to FIGS. 5, 5A and 5B, pallets 11 are retained in channel track 35 free from chain links 18 adjacent finishing station 13 carrying parisons 31 on plugs 30 ready for the finishing operation. Finishing station 13 as shown in FIG. 5 includes fixed platen 82 and movable platen 83 with blow mold 84 therebetween containing a mold 85 in the shape of the bottle to be formed. Movable platen 83 moves on tie rods 86 activated by motor 87. Base mold 88 is held by support 88a and is positioned above mold 85 to form the bottle bottom with piston 89 connected thereto for moving the bottom mold into appropriate alignment for formation of the desired base for the bottle and motive means, not shown, connected thereto for activating said piston. Linkage means 90 and 91 are provided connected to the movable platen 83 and bottom mold 88, respectively, in order to maintain the desired positioning thereof. Channel track 92 slides on tie rods 86 and sits spaced from but closely adjacent to channel track 35 being moved by top and bottom linkage means 90 and 91. For better clarity of the drawings, only bottom linkage means 90 is shown in FIG. 5. Engaging means 93 shown in FIGS. 1 and 5B comprises a piston 94 having a piston arm 95 with a first engaging lug 96 engaging a groove 97 in an upstream pallet 11 and a second engaging lug 98 engaging a similar groove 97 in a downstream pallet 11. First engaging lug 96 and second engaging lug 98 are rotatable in the direction of the arrow to engage and disengage grooves 97. Thus, in operation first and second engaging lugs 96 and 98 are rotated to engage grooves 97 on a pallet 11 sitting outside finishing station 13 and a pallet sitting inside finishing station 13, respectively. The piston arm 95 then moves forward to move the pallet inside the finishing station with blown bottles thereon to a position outside the finishing station 13 and move a second pallet from a position outside the finishing station to a position inside the finishing station. Second piston 99 is now operated to rotate the first and second engaging lugs 96 and 98, respectively, to disengage grooves 97 and the piston arm is retracted to engage a further set of pallets for repeat of the cycle. Movable platen 83 is closed. Bottom mold 88 is moved into position via piston 89 and the blowing operation commenced. As shown specifically in FIG. 5A, a space 100 is provided to permit air to be inserted inside the parison although any other suitable means may be used for this purpose. If desired, a plug can be activated to axially stretch the parison in order to provide an oriented article and the parison is blown to its full shape as shown in FIG. 5A. When the blow mold is opened channel track 92 moves a desired distance guided by linkage means 90 in order to move the final blown article 102 the desired distance and free it from the mold 85. The pallet 11 with finished articles thereon is then moved from the finishing station to a point past or downstream of the finishing station. Pusher means 112 is located downstream of the finishing station connected to piston 113 which may be connected to any desired motive means. Track 114 engages discharge station 110 with return station 115. Thus, in operation piston 113 positions the pallet 11 containing blown articles 102 via pusher means 112 along tracks 114 to return station 115. At return station 115 the empty pallets are moved to the second conveyor means via second engaging means 116 which corresponds to engaging means 93. Located at return station 115 is discharge station 110 used to remove finished articles 102 from pallets 11 via for example a suction tube 111 or any desired means. The empty pallets are then transferred to the second conveyor means at a rate exactly corresponding to the movement of the pallets in the first conveyor means and in the finishing station. Although a particular engaging means has been shown, naturally any engaging means may be used to move the pallets in and out of the finishing station, and to move the empty pallets to the second conveyor means.

If desired the process and apparatus of the present invention may be conveniently employed to prepare multi-layered hollow plastic articles by applying a sleeve member either inside preform 31 or outside preform 31, with the composite preform consisting of preform 31 and sleeve member heated in temperature conditioning means 70 and blown together. For example, a sleeve or liner member may be applied to plugs 30 on their return flight on second conveyor means 14. Thus, pallets 11 return to receiving station 12 containing sleeve member thereon so that preform 31 is applied over the sleeve member and the composite conditioned and blown together at finishing station 13. Alternatively, a sleeve member may be applied on the outside of preform 31 downstream of receiving station 12 but before temperature conditioning means 70 so that the composite preform and sleeve member are conditioned together in the temperature conditioning means 70 and blown together at the finishing station 13. The resultant multi-layered article is characterized by properties of both materials, that is, the sleeve and preform, so that one can design a finished article having a desirable combination of properties not possible in a single layered material.

Figure 6:
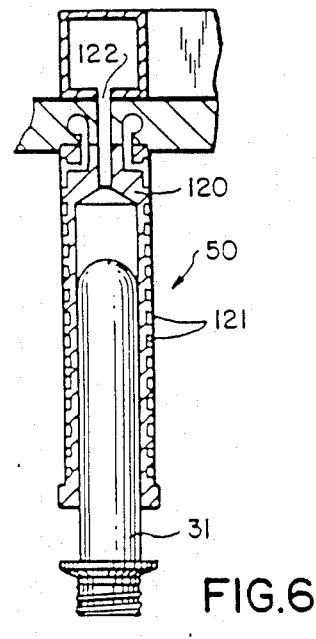
FIG. 6 is a detailed view of the carrying means for conveying the parisons from the injection mold to the receiving station at one point in the operation.
Figure 7:
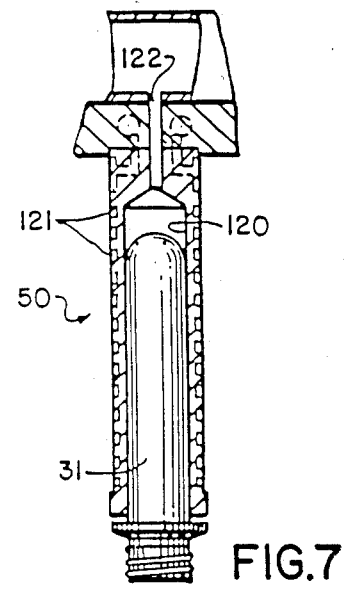
FIG. 7 is a detailed view of the same carrying means for conveying the parisons from the injection mold to the receiving station at a later stage in the operation.

Referring now to FIGS. 6 and 7, these show a preferred form of parison carrying means. In past practice, the parisons were stripped into a guide tube the inside dimension of which was typically larger than that of the parisons. The parisons were then supported on the shoulder of the guide tubes by suction within the guide tubes. Upon insertion of the parison into the guide tube internal pressure was applied within the guide tube causing the still pliable parison to expand against the walls of the guide tube and thereby establishing heat transfer contact in order to obtain cooling of the parison. A pressure differential between the inside of the parison and the space between the outside thereof and the guide tube can be established by applying higher than atmospheric pressure inside the guide tube or by applying vacuum therein. Naturally, this type of system can be readily used in combination with the present invention. However, it has been found that this type of system is not entirely successful since it is difficult to carry out and necessitates accurate and expensive locating means to place the parisons into the guide tubes.

According to a preferred practice of the present invention, carrying tube 50 is provided with a cavity 120 having tapered walls as, for example, a taper of 0 degrees, 25 minutes, 30 seconds, the taper thereof being the same as the taper of the parison. Parisons are normally tapered in order to facilitate removal from the injection mold. The mouth dimension of carrying tube 50 is chosen so as not to permit the parison to fill cavity 120 completely. Instead, at the time of insertion, a small portion of the parison will protrude from carrying tube 50. Carrying tube 50 is provided with temperature control means schematically indicated by channels 121 which can be connected to any source of heat transfer fluid. Suction channel 122 is provided for removal of air from cavity 120 during insertion of the parison and is used to apply vacuum within cavity 120. It is seen that parison 31 will make contact with the inner mold wall due to the taper but only to the extent that the opening of the guide tube will permit. As the parison 31 cools in contact with the guide tube wall due to the pressure differential established between the atmosphere inside the parison and the vacuum applied through channel 122, it is reduced in size and therefore slides downward along the tapered wall of the guide tube. FIG. 7 is a schematic sectional view which shows the parison in its final position. Thus, it can be seen that the cooling effect due to surface contact between the parison and the guide tube is in this instance given by a taper which, of course, is also an automatic locating means for centering the parison in the cavity. Accordingly, in this improved post cooling mold, there is no need for expensive locating devices in the cooling process. It is automatically accomplished by virtue of the dimensional change which occurs in the parison in the course of cooling.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for preparing hollow plastic articles which comprises: injection molding a first number of plastic parisons in an injection molding operation in an injection molding cycle; transferring said first number of plastic parisons to a multiplicity of pallets at a receiving station wherein each pallet holds a second number of plastic parisons less than said first number, with the output of the injection molding operation coordinated with the receiving station; conveying said pallets with parisons thereon in a single row from said receiving station to a finishing station for forming said parisons into said hollow plastic articles; returning said pallets from said finishing station to said receiving station in a single row one at a time in a continuous operation including continuously transferring said pallets to said receiving station one at a time until the number of pallets at the receiving station is suitable for receiving said first number of plastic parisons; providing a temperature conditioning means between said receiving station and finishing station and conditioning the temperature of the parisons to render same suitable for forming into said hollow plastic articles at said finishing station; and transporting said pallets with parisons thereon through said temperature conditioning means in a single row to first equalize the temperature of said parisons and second obtain the desired temperature profile for forming into said hollow plastic article.

2. A process according to claim 1 wherein said pallets are removed from said receiving station one at a time and are returned said receiving station one at a time.

3. A process according to claim 1 including the step of post-cooling the parisons between the injection molding operation and the receiving station.

4. A process according to claim 1 including the step of rotating the parisons as they are transported through the temperature conditioning means.

5. A process according to claim 1 including the step of passing the parisons through a temperature conditioning tunnel to condition the temperature of the parisons.

6. A process according to claim 1 including transferring said pallets one at a time with parisons thereon to said finishing station and simultaneously transferring said pallets one at a time from said finishing station with hollow plastic articles thereon to a discharge station.

* * * * *